United States Patent
Cabral Frias et al.

(10) Patent No.: US 8,361,284 B2
(45) Date of Patent: *Jan. 29, 2013

(54) REDUCING THE HEIGHT OF A DEFECT ASSOCIATED WITH AN AIR BEARING SURFACE

(75) Inventors: Roberto Cabral Frias, Jalisco (MX); Mario Garcia De la Cruz, Jalisco (MX); Cherngye Hwang, San Jose, CA (US); Tetsuya Matsusaki, Kanagawa-Ken (JP); Omar E. Montero Camacho, Jalisco (MX); Yongjian Sun, San Jose, CA (US)

(73) Assignee: HGST, Netherlands B.V., Amsterdam (NL)

( * ) Notice: Subject to any disclaimer, the term of this patent is extended or adjusted under 35 U.S.C. 154(b) by 1161 days.

This patent is subject to a terminal disclaimer.

(21) Appl. No.: 11/800,182

(22) Filed: May 3, 2007

(65) Prior Publication Data

US 2008/0273271 A1    Nov. 6, 2008

(51) Int. Cl.
    C23C 14/32    (2006.01)

(52) U.S. Cl. .............. 204/192.32; 204/192.35
(58) Field of Classification Search ............ 204/192.32, 204/192.34
    See application file for complete search history.

(56) References Cited

U.S. PATENT DOCUMENTS

| | | | |
|---|---|---|---|
| 5,438,747 A * | 8/1995 | Krounbi et al. | 29/603.16 |
| 6,423,240 B1 * | 7/2002 | Wang et al. | 216/22 |
| 7,120,988 B2 | 10/2006 | Le et al. | |
| 2006/0132983 A1 | 6/2006 | Osugi et al. | |

* cited by examiner

*Primary Examiner* — Rodney McDonald

(57) ABSTRACT

A method for reducing the height of a defect associated with an air bearing surface of a hard disk drive slider is disclosed. The technology initially ion mills for a first period of time at a first angle relative to an air bearing surface of a disk drive slider to remove a first portion of the air bearing surface. Then the technology ion mills for a second period of time at a second angle relative to an air bearing surface of the disk drive slider to remove a second portion of the air bearing surface. The second portion of the air bearing surface comprises a defect wherein the ion milling at the second angle reduces the height of the defect with respect to the air bearing surface.

7 Claims, 4 Drawing Sheets

REDUCING THE HEIGHT OF A DEFECT ASSOCIATED WITH AN AIR BEARING SURFACE

TECHNICAL FIELD

The field of the present technology relates to ion milling. More particularly, embodiments of the present technology relate to the air bearing surface associated with a hard disk drive slider.

BACKGROUND ART

Hard disk drives are used in many electronic devices such as desktop computers, laptop computers, MP3 players, Global Positioning Systems, Personal Digital Assistant devices and other devices for data storage. As a key component of hard disk drive, a magnetic head reads and writes the data from and onto a magnetic disk while the magnetic head flies above the disk at a well defined distance. This distance is also called the fly height in the data storage industry. The fly height is a function many factors, including the patterned shape of the air bearing surface, various levels of cavities on the air bearing surface, the depth of the cavities, and the rail width. The ion milling process is one of the processes in conjunction with the photo lithography process used to create a cavity with a designed depth and shape on an air bearing surface.

Ion milling is a process applied to an object under vacuum whereby a selected area of the object's surface can be bombarded by an energetic beam of ions. This bombardment removes material from the object's surface. Through the process of ion milling, a slider's air bearing surface will be etched into a pre-determined contoured shape.

However, there exist many limitations to the current state of technology with respect to ion milling. For example, these different processing steps of different design considerations create functionality complications in regards to the hard disk drive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for reducing the height of a defect associated with an air bearing surface of a hard disk drive slider is disclosed. The technology initially ion mills for a first period of time at a first angle relative to an air bearing surface of a disk drive slider to remove a first portion of the air bearing surface. Then the technology ion mills for a second period of time at a second angle relative to an air bearing surface of the disk drive slider to remove a second portion of the air bearing surface. The second portion of the air bearing surface comprises a defect wherein the ion milling at the second angle reduces the height of the defect with respect to the air bearing surface.

DESCRIPTION OF THE DRAWINGS

The accompanying drawings, which are incorporated in and form a part of this specification, illustrate embodiments of the technology for selectively utilizing a plurality of disparate solid state storage locations and, together with the description, serve to explain the principles discussed below.

The drawings referred to in this description should be understood as not being drawn to scale except if specifically noted.

DETAILED DESCRIPTION

Reference will now be made in detail to embodiments of the present technology. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology. However, it will be recognized by one of ordinary skill in the art that the present technology may be practiced without these specific details. In other instances, well known methods, procedures, components, and have not been described in detail as not to unnecessarily obscure aspects of the present embodiments.

The discussion will begin with an overview of an ion milling process and the resulting defect associated with an air bearing surface of a hard disk drive slider. The discussion will then focus on embodiments of the invention that provide an ion milling apparatus for removing material from an air bearing surface of a hard disk drive slider. The discussion will then focus on the method for reducing the height of a defect associated with an air bearing surface of a hard disk drive slider.

Overview

Figure 1:
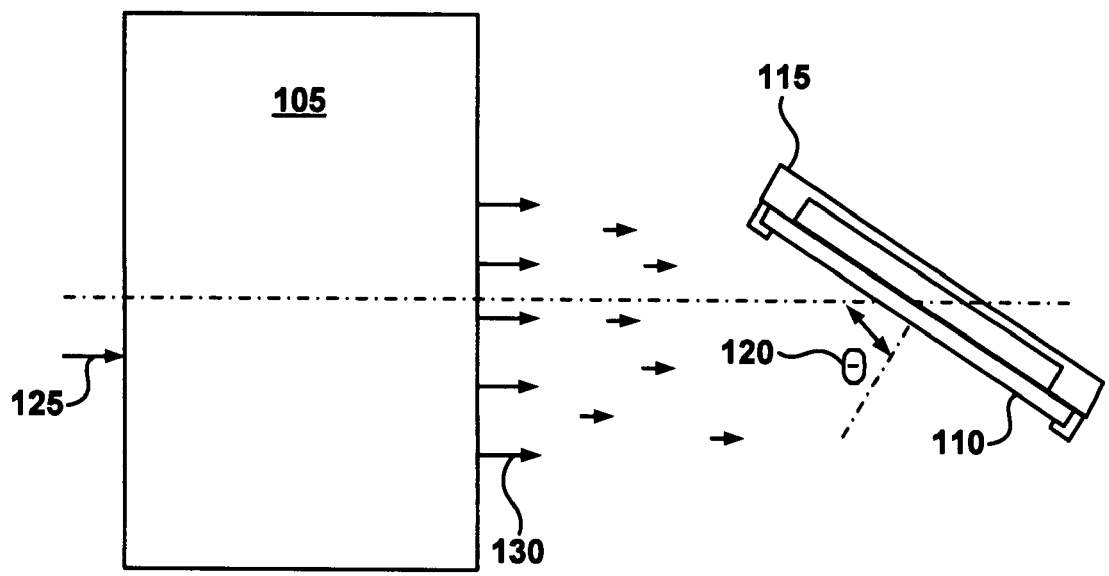
FIG. 1 is a diagram of an example ion milling apparatus in accordance with one embodiment of the present technology.

With reference now to 100 of FIG. 1, a schematic drawing of one embodiment of an ion mill apparatus 100 is shown. Ion mill apparatus 100 comprises ion emitter 105, and hard disk drive slider 110 (hereinafter, "slider 110") coupled to fixture 115. Ion emitter 105 may be any ion emitter capable of emitting received gas 125 as ions 130, as is shown in FIG. 1. In one embodiment, gas 125 is argon gas, and ions 130 are argon ions. It is appreciated that gas 125 and ions 130 may be gas and ions other than Argon.

Slider 110 as represented in FIG. 1 may be just one slider or a plurality of sliders exposed to the etching process of ion emitter 105. Additionally, a plurality of sliders may be termed to be a "pallet".

Ions 130 are projected towards slider 110 at a pre-determined speed for a pre-determined time period, to encounter slider 110 at a pre-determined angle theta 120. Additionally, fixture 115 and slider 110 continuously rotate during the ion milling process, while maintaining a pre-determined fixed angle theta 120. The axis of rotation for fixture 115 and slider 110 is perpendicular to the plane of the slider. Furthermore, in one embodiment, fixture 115 and slider 110 remain still while ion mill apparatus 105 rotates continuously during the ion milling process, while maintaining a pre-determined fixed angle theta 120.

During ion milling using ion milling apparatus 100, the bombardment of ions 130 erodes slider's 110 surface. At the same time, however, a re-deposition process also occurs because the ion milling plasma atmosphere is rich with various elements sputtered from substrate, photo resist, and chamber wall materials such as NiFe, $Al_2O_3$, TiC, and hydro carbon from photo resist, etc. In addition, this bombardment can also cause damage to slider 110 by ion implantation upon the photo resist footing at the slider's 110 air bearing surface. Re-deposition build-up and implantation upon the photo resist footing at the slider's 110 air bearing surface may not be completely removed through chemical stripping and brush cleaning, thus leaving a defect with a measurable height on slider's 110 air bearing surface. As a result of such defect, slider 110 undesirably pitches, rolls, and scratches the hard disk, eventually causing hard disk drive failure.

Figure 2:
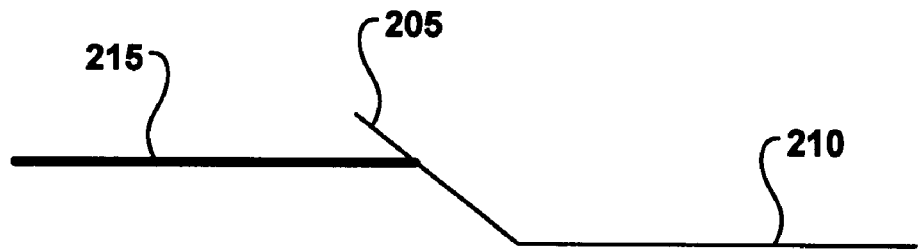
FIG. 2 is a diagram of an example defect of an air bearing surface in accordance with embodiments of the present technology.

With reference now to 200 of FIG. 2, a schematic drawing of one embodiment of slider 110 after being ion milled comprising a defect 205 is shown. Slider 200 has an air bearing surface 215, a defect 205, and a negative pressure pocket 210. Air bearing surface 215 has a carbon overcoat on it. In combination with the carbon overcoat or alone, there may also be other layers of substances on the air bearing surface. Defect 205 may also be described as a "re-deposition" or a "fence".

For example, defect 205 may be measured at 5 nm high, 9 nm high, or at n . . . nm high (wherein n . . . may represent any measurable height). Defect 205 is composed of by-products of the ion milling process, and has a measurable height. In one embodiment, slider 200 is composed of AlTiC, but it is appreciated that slider 200 may be some other substance.

Figure 3:
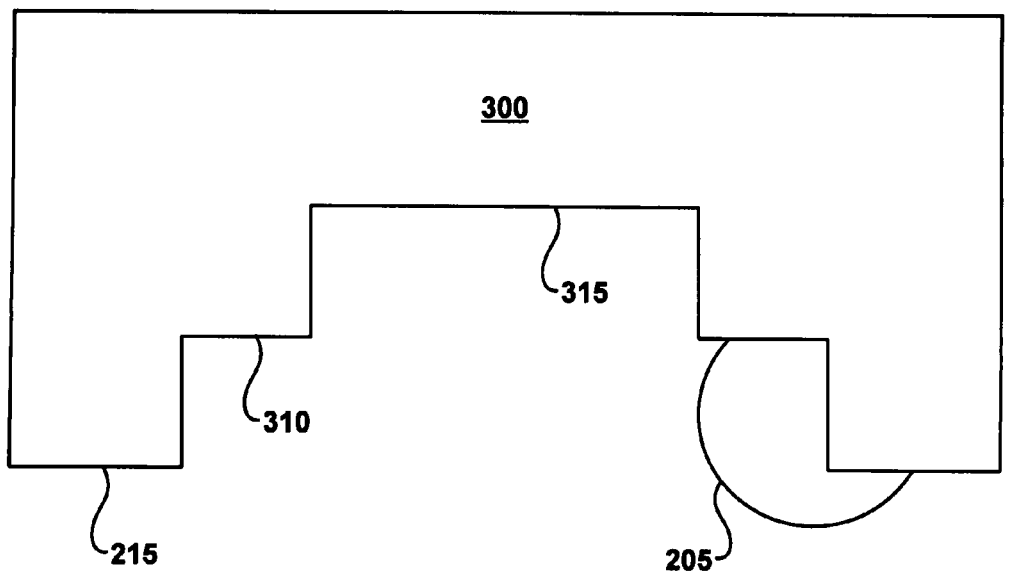
FIG. 3 is a cross sectional view of an example disk drive slider in accordance with embodiments of the present invention.

With reference now to FIG. 3 and to FIG. 2, a cross section view of an exemplary disk drive slider 300 is shown in accordance with embodiments of the present invention. Disk drive slider 300 has an air bearing surface 215, a first etched surface 310, a second etched surface 315, and defect 205. Defect 205 extends above the plane of air bearing surface 215. It is appreciated that disk drive slider 300 may have n . . . number of etched surfaces according to the limitations of disk drive slider 300 itself. Additionally, defect 215 may be any shape or any size.

Figure 4:
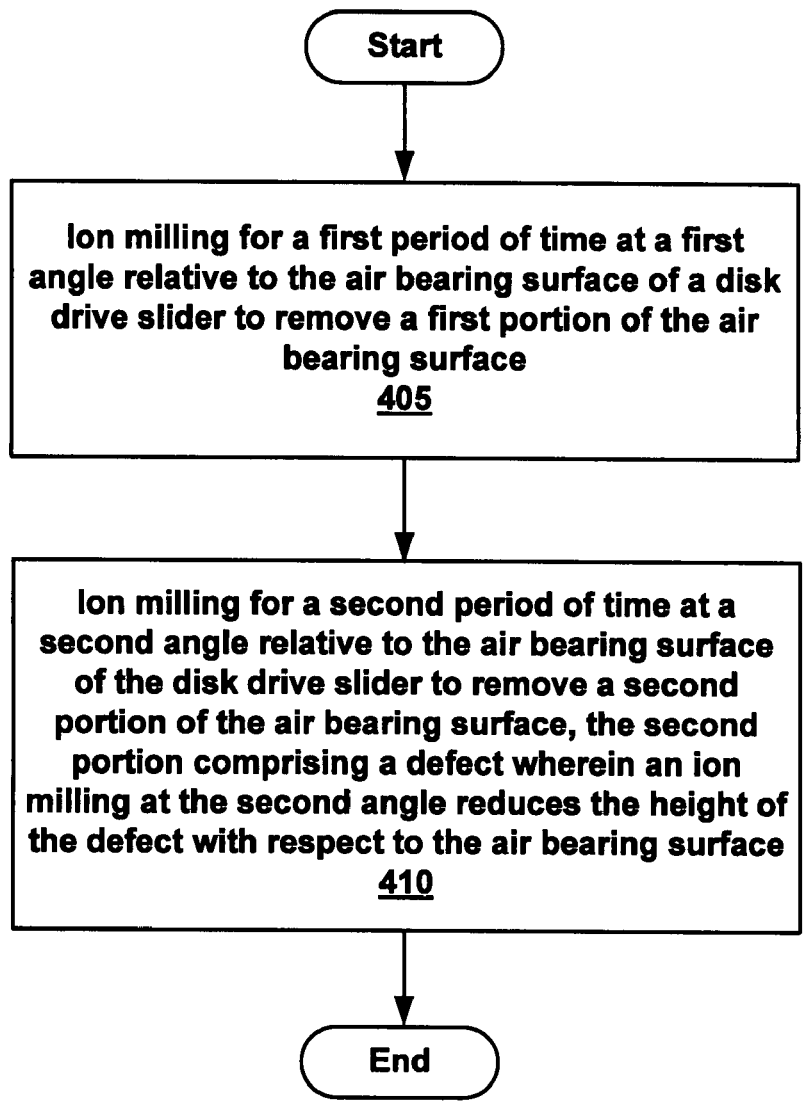
FIG. 4 is a flowchart of an example method for reducing the height of a defect associated with an air bearing surface of a hard disk drive slider in accordance with one embodiment of the present technology.

With reference now to FIG. 4, a flowchart 400 of an example method for reducing the height of defect 205 associated with slider's 110 air bearing surface is shown in accordance with one embodiment of the present technology.

Referring now to 405 of FIG. 4, FIG. 1, and to FIG. 2, according to one embodiment, ion milling occurs for a first period of time at a first angle theta 120 relative to the air bearing surface of slider 110 to remove a first portion of air bearing surface 215. In one embodiment, the first angle may be between 0 degrees and 65 degrees with respect to slider's 110 air bearing surface.

The ion milling apparatus 100 of FIG. 1 removes material from slider 110. The removal rate of material is dependant upon many factors. For example, the material in slider 110, the intensity of the ion beam, and angle theta 120 of the ion beam are all factors that can affect the rate of material removal from slider 110. Specifically, the angle theta 120 at which the ion beam is focused on slider 110 greatly affects the amount of material removed. For example, at a certain angle of incidence with respect to slider 110, very little material is removed.

Angles used in the ion milling process may be chosen based upon time needed to remove material and other parametric factors such as the cavity wall angle, the cavity roughness, etc. For example, an angle is chosen based upon how much material may be removed at a given angle, for a given period of time.

Depending upon configurations of ion milling apparatus 100, there is an angle theta 120 which achieves the highest rate of removal. For purposes of realizing high through-put, the angle that achieves the highest material removal rate should be used.

In accordance with embodiments of the present invention, the angle theta 120 that achieves the highest material removal rate and hence the highest through-put for ion milling for a first period of time is between 0 and 65 degrees.

Referring now to 410 of FIG. 400 and to FIG. 1, FIG. 2, and FIG. 3, according to one embodiment, ion milling occurs for a second period of time at a second angle relative to the air bearing surface of slider 110 to remove a second portion of the air bearing surface. The second portion comprises defect 205 wherein ion milling at the second angle reduces the height of defect 205 with respect to slider 110's air bearing surface. In one embodiment, the first angle described herein is less than the second angle described herein. Furthermore, in one embodiment, the second angle may be between 70 degrees and 85 degrees with respect to slider's 110 air bearing surface.

For reasons already stated herein, in accordance with embodiments of the present invention, the angle theta 120 that achieves the highest material removal rate and hence the highest through-put for ion milling for a second period of time is between 70 and 85 degrees.

Embodiments of the present technology provide for ion milling at two separate angles to remove a portion of the air bearing surface. The time spent ion milling at the first angle and at the second angle is equal to the total amount of time spent ion milling. A certain percentage of time is spent ion milling at the first angle, and a certain percentage of time is spent ion milling at the second angle. It is appreciated that the percentage of time spent ion milling at the first angle may be any percentage of the total time spent ion milling.

For example, the percentage of time spent ion milling at the first angle may be 90 percent. Therefore, the percentage of time spent ion milling at the second angle is 10 percent. In another example, the percentage of time spent ion milling at the first angle is 40 percent and the percentage of time spent ion milling at the second angle is 60 percent.

In one embodiment of the present technology, the first period of time is greater than the second period of time. For example, the time spent ion milling for a first period of time may be three minutes and forty-five seconds. Whereas, the time spent ion milling for a second period of time at a different angle may be one minute and fifteen seconds. Slider 110 was ion milled for a total of five minutes. Seventy-five percent of the time spent ion milling was done at angle theta 120, while twenty-five percent of the time spent ion milling was done at an angle different than angle theta 120.

In an example of the present technology, defect 205 is formed on slider's 110 air bearing surface during ion milling at first angle theta 120. In another embodiment, defect 205 was already present before ion milling at first angle theta 120. In yet another embodiment, defect 205 is present, but is deposited upon some location of slider 110 other than slider's 110 air bearing surface.

In one embodiment of the present technology, defect 205 is reduced to a height of less than three nanometers with respect to slider's 110 air bearing surface. However, it is appreciated that defect 205 may be reduced to any pre-determined height or more or less than three nanometers with respect to slider's 110 air bearing surface.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for reducing the height of a defect associated with an air bearing surface of a hard disk drive slider, said method comprising:

ion milling for a first period of time at a first angle relative to said air bearing surface of said disk drive slider to remove a portion of said air bearing surface, said air bearing surface comprising a defect extending above said air bearing surface; and ion milling for a second period of time at a second angle relative to said air bearing surface of said disk drive slider to remove said defect of said air bearing surface, said defect extending above said air bearing surface, wherein said ion milling at said second angle reduces the height of said defect with respect to said air bearing surface.

2. The method as described in claim 1 wherein said first angle is less than said second angle.

3. The method as described in claim 1 wherein said first angle is between 0 and 65 degrees with respect to said air bearing surface.

4. The method as described in claim 1 wherein said second angle is between 70 and 85 degrees with respect to said air bearing surface.

5. The method as described in claim 1 wherein said first period of time is greater than said second period of time.

6. The method as described in claim 1 wherein said defect is formed on said air bearing surface during said ion milling at said first angle.

7. The method as described in claim 1 wherein said defect is reduced to a height of less than 3 nanometers with respect to said air bearing surface.

* * * * *